United States Patent
Han et al.

(10) Patent No.: US 11,444,326 B2
(45) Date of Patent: Sep. 13, 2022

(54) HETEROCYCLIC SULFONYL FLUORIDE ADDITIVES FOR ELECTROLYTE COMPOSITION FOR LITHIUM BATTERIES

(71) Applicant: BASF SE, Ludwigshafen am Rhein (DE)

(72) Inventors: Zhenji Han, Amagasaki (JP); Takeo Fukuzumi, Amagasaki (JP); Eri Sawada, Amagasaki (JP); Martin Schulz-Dobrick, Heidelberg (DE); Jinbum Kim, Amagasaki (JP)

(73) Assignee: BASF SE, Ludwigshafen am Rhein (DE)

( * ) Notice: Subject to any disclaimer, the term of this patent is extended or adjusted under 35 U.S.C. 154(b) by 309 days.

(21) Appl. No.: 16/619,213

(22) PCT Filed: Jul. 18, 2018

(86) PCT No.: PCT/EP2018/069535
§ 371 (c)(1),
(2) Date: Dec. 4, 2019

(87) PCT Pub. No.: WO2019/016281
PCT Pub. Date: Jan. 24, 2019

(65) Prior Publication Data
US 2020/0212487 A1    Jul. 2, 2020

(30) Foreign Application Priority Data
Jul. 20, 2017 (EP) .................... 17182249

(51) Int. Cl.
| | |
|---|---|
| *H01M 10/00* | (2006.01) |
| *H01M 10/0567* | (2010.01) |
| *H01M 10/0525* | (2010.01) |
| *H01M 10/0569* | (2010.01) |

(52) U.S. Cl.
CPC ... *H01M 10/0567* (2013.01); *H01M 10/0525* (2013.01); *H01M 10/0569* (2013.01); *H01M 2300/0037* (2013.01)

(58) Field of Classification Search
CPC ......... H01M 10/0525; H01M 10/0569; H01M 2300/0037; H01M 10/0567; H01M 10/052; Y02E 60/10
See application file for complete search history.

(56) References Cited

U.S. PATENT DOCUMENTS

| | | |
|---|---|---|
| 2002/0009652 A1 | 1/2002 | Ueda et al. |
| 2012/0088160 A1 | 4/2012 | Zhang et al. |
| 2014/0186721 A1 | 7/2014 | Zhang et al. |
| 2014/0272606 A1 | 9/2014 | Chu et al. |
| 2016/0164143 A1* | 6/2016 | Sawa .............. H01M 4/587 429/200 |
| 2017/0162906 A1 | 6/2017 | Nakazawa et al. |

FOREIGN PATENT DOCUMENTS

| | | |
|---|---|---|
| EP | 1 160 899 A2 | 12/2001 |
| EP | 3 185 347 A1 | 6/2017 |
| JP | 2014-127354 A | 7/2014 |
| WO | WO 2013/026854 A1 | 2/2013 |

OTHER PUBLICATIONS

International Search Report dated Sep. 20, 2018 in PCT/EP2018/069535 filed on Jul. 18, 2018.
U.S. Appl. No. 15/765,362, filed Apr. 2, 2018, US 2018-0254516 A1, Zhenji Han.
U.S. Appl. No. 16/479,642, filed Jul. 22, 2019, Zhenji Han.
Extended European Search Report dated Oct. 6, 2017 in Patent Application No. 17182249.7.
Elazari, R. et al. "Rechargeable lithiated silicon-sulfur (SLS) battery prototypes" Electrochemistry Communications, vol. 14, No. 1, Jan. 2012, pp. 21-24.
Krutak, J.J. et al. "Chemistry of Ethenesulfonyl Fluoride. Fluorosulfonylethylation of Organic Compounds" The Journal of Organic Chemistry, vol. 44, No. 22, Oct. 1979, pp. 3847-3858.

* cited by examiner

*Primary Examiner* — Cynthia H Kelly
*Assistant Examiner* — Monique M Wills
(74) *Attorney, Agent, or Firm* — Lowenstein Sandler LLP

(57) ABSTRACT

Heterocyclic sulfonyl fluoride additives for electrolyte composition for lithium batteries An electrolyte composition containing •(i) at least one aprotic organic solvent; •(ii) at least one conducting salt; •(iii) at least one compound of formula (I) wherein $R^1$, $R^2$, and $R^3$ are each independently H or a $C_1$-$C_{20}$ hydrocarbon group which may be unsubstituted or substituted by one or more substituents selected from F, CN, $OS(O)_2F$, and $S(O)_2F$ and which may contain one or more groups selected from —O—, —S—, —C(O)O—, —OC(O)—, and —$OS(O)_2$—; wherein at least one of $R^1$, $R^2$, and $R^3$ is substituted by one or more $S(O)_2F$ groups; and •(iv) optionally one or more additives.

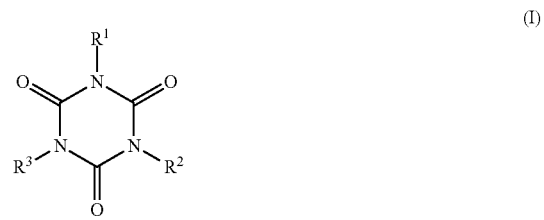

(I)

13 Claims, No Drawings

HETEROCYCLIC SULFONYL FLUORIDE ADDITIVES FOR ELECTROLYTE COMPOSITION FOR LITHIUM BATTERIES

The present invention relates to the use of compounds of formula (I)

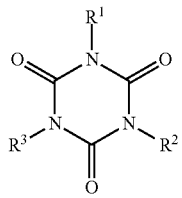

(I)

wherein $R^1$, $R^2$, and $R^3$ are defined as described as below, in electrolyte compositions, to electrolyte compositions containing one or more compounds of formula (I) for electrochemical cells and to electrochemical cells comprising such electrolyte compositions.

Storing electrical energy is a subject of still growing interest. Efficient storage of electric energy allows electric energy to be generated when it is advantageous and to be used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 5 V) in comparison with other battery systems. For that reason, these systems have become widely used as a power source for many portable electronics such as cellular phones, laptop computers, mini-cameras, etc. They are also increasingly used as power supply in automobiles.

In secondary lithium batteries like lithium ion batteries organic carbonates, ethers, esters and ionic liquids are used as sufficiently polar solvents for solvating the conducting salt(s). Most state of the art lithium ion batteries in general comprise not a single solvent but a solvent mixture of different organic aprotic solvents.

Besides solvent(s) and conducting salt(s) an electrolyte composition usually contains further additives to improve certain properties of the electrolyte composition and of the electrochemical cell comprising said electrolyte composition. Common additives are for example flame retardants, overcharge protection additives and film forming additives which react during first charge/discharge cycle on the electrode surface thereby forming a film on the electrode. The film protects the electrode from direct contact with the electrolyte composition and thereby improves the cycling behaviour and life time of the electrochemical cell.

JP 2014-127354 A1 discloses different additives for electrolyte compositions for lithium batteries for achieving both high overcharge prevention properties and deterioration suppression of the battery performance. Some of the additives are based on a 2,4,6-trioxo[1,3,5]triazine wherein the nitrogen atoms of the triazine cycle are substituted by different organic groups like carbonic acid esters and sulfonyl alkyl groups.

JP 2014-127354 A1 describes electrolyte solutions containing an additive for increasing cycle life and improving internal resistance. The additive is based on a 2,4,6-trioxo[1,3,5]triazine which is substituted by different organic substituents, inter alia by a vinyl sulfonyl group. The additive is used to provide lithium secondary batteries with a good balance of performance and durability in respect to capacity, resistance and output characteristics.

Despite the different additives known for improving the performance of electrochemical cells like secondary lithium batteries, there is still the need for additives and electrolyte compositions which help to improve the performance of the electrochemical cells further on. It is an object of the present invention to provide additives for electrolyte compositions and electrolyte compositions with good electrochemical properties like long cycle life, high capacity retention, lower resistance build up during cycling, and good storage stability. It is a further object of the invention to provide electrochemical cells with good electrochemical properties like long cycle life, high capacity retention and good storage stability.

This object is achieved by an electrolyte composition containing
(i) at least one aprotic organic solvent;
(ii) at least one conducting salt;
(iii) at least one compound of formula (I)

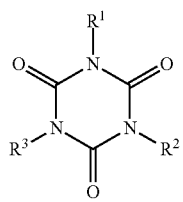

(I)

wherein
$R^1$, $R^2$, and $R^3$ are each independently H or a $C_1$-$C_{20}$ hydrocarbon group which may be unsubstituted or substituted by one or more substituents selected from F, CN, $OS(O)_2F$, and $S(O)_2F$ and which may contain one or more groups selected from —O—, —S—, —C(O)O—, —OC(O)—, and —OS(O)$_2$—;
wherein at least one of $R^1$, $R^2$, and $R^3$ is substituted by one or more $S(O)_2F$ groups; and
(iv) optionally one or more additives.

The problem is further solved by the use of compounds of formula (I) in electrolyte compositions, and by electrochemical cells comprising such electrolyte compositions.

Electrochemical cells comprising electrolyte compositions containing a compound of formula (I) show improved capacity retention and good cycling performance.

In the following the invention is described in detail.

The electrolyte composition according to the present invention contains
(i) at least one aprotic organic solvent;
(ii) at least one conducting salt;
(iii) at least one compound of formula (I)

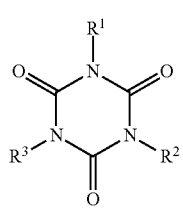

(I)

wherein

R$^1$, R$^2$, and R$^3$ are each independently H or a C$_1$-C$_{20}$ hydrocarbon group which may be unsubstituted or substituted by one or more substituents selected from F, CN, OS(O)$_2$F, and S(O)$_2$F and which may contain one or more groups selected from —O—, —S—, —C(O)O—, —OC(O)—, and —OS(O)$_2$—;

wherein at least one of R$^1$, R$^2$, and R$^3$ is substituted by one or more S(O)$_2$F groups; and (iv) optionally one or more additives.

The electrolyte composition preferably contains at least one aprotic organic solvent as component (i), more preferred at least two aprotic organic solvents (i). According to one embodiment the electrolyte composition may contain up to ten aprotic organic solvents.

The at least one aprotic organic solvent (i) is preferably selected from fluorinated and non-fluorinated cyclic and acyclic organic carbonates, fluorinated and non-fluorinated ethers and polyethers, fluorinated and non-fluorinated cyclic ethers, fluorinated and non-fluorinated cyclic and acyclic acetales and ketales, fluorinated and non-fluorinated orthocarboxylic acids esters, fluorinated and non-fluorinated cyclic and acyclic esters and diesters of carboxylic acids, fluorinated and non-fluorinated cyclic and acyclic sulfones, fluorinated and non-fluorinated cyclic and acyclic nitriles and dinitriles, fluorinated and non-fluorinated cyclic and acyclic phosphates, and mixtures thereof.

The aprotic organic solvent(s) (i) may be fluorinated or non-fluorinated. "Fluorinated" means, that the aprotic organic solvent(s) may be partly fluorinated or fully fluorinated. "Partly fluorinated" means, that one or more H of the respective molecule are substituted by a F atom. "Fully fluorinated" means that all H of the respective molecule are substituted by a F atom. The at least one aprotic organic solvent may be selected from fluorinated and non-fluorinated aprotic organic solvents, i.e. the electrolyte composition may contain a mixture of fluorinated and non-fluorinated aprotic organic solvents.

Examples of fluorinated and non-fluorinated cyclic carbonates are ethylene carbonate (EC), propylene carbonate (PC) and butylene carbonate (BC), wherein one or more H may be substituted by F and/or a C$_1$ to C$_4$ alkyl group like 4-methyl ethylene carbonate, monofluoroethylene carbonate (FEC), and cis- and trans-difluoroethylene carbonate. Preferred cyclic carbonates are ethylene carbonate, monofluoroethylene carbonate, and propylene carbonate, in particular ethylene carbonate.

Examples of fluorinated and non-fluorinated acyclic carbonates are di-C$_1$-C$_{10}$-alkylcarbonates, wherein each alkyl group is selected independently from each other and wherein one or more H may be substituted by F. Preferred are fluorinated and non-fluorinated di-C$_1$-C$_4$-alkylcarbonates. Examples are diethyl carbonate (DEC), ethyl methyl carbonate (EMC), 2,2,2-trifluoroethyl methyl carbonate (TFEMC), dimethyl carbonate (DMC), trifluoromethyl methyl carbonate (TFMMC), and methylpropyl carbonate. Preferred acyclic carbonates are diethyl carbonate (DEC), ethyl methyl carbonate (EMC), and dimethyl carbonate (DMC).

In one embodiment of the invention the electrolyte composition contains mixtures of optionally fluorinated acyclic organic carbonates and cyclic organic carbonates at a ratio by weight of from 1:10 to 10:1, preferred of from 3:1 to 1:1.

Examples of fluorinated and non-fluorinated acyclic ethers and polyethers are fluorinated and non-fluorinated di-C$_1$-C$_{10}$-alkylethers, di-C$_1$-C$_4$-alkyl-C$_2$-C$_6$-alkylene ethers, and polyethers, and fluorinated ethers of formula R'—(O—CF$_p$H$_{2-p}$)$_q$—R" wherein R' is a C$_1$-C$_{10}$ alkyl group or a C$_3$-C$_{10}$ cycloalkyl group, wherein one or more H of an alkyl and/or cycloalkyl group are substituted by F; R" is H, F, a C$_1$-C$_{10}$ alkyl group, or a C$_3$-C$_{10}$ cycloalkyl group, wherein one or more H of an alkyl and/or cycloalkyl group are substituted by F; p is 1 or 2; and q is 1, 2 or 3.

According to the invention each alkyl group of the fluorinated and non-fluorinated di-C$_1$-C$_{10}$-alkylethers is selected independently from the other wherein one or more H of an alkyl group may be substituted by F. Examples of fluorinated and non-fluorinated di-C$_1$-C$_{10}$-alkylethers are dimethylether, ethylmethylether, diethylether, methylpropylether, diisopropylether, di-n-butylether, 1,1,2,2-tetrafluoroethyl-2,2,3,3-tetrafluoropropyl ether (CF$_2$HCF$_2$CH$_2$OCF$_2$CF$_2$H), and 1H,1H,5H-perfluoropentyl-1,1,2,2-tetrafluoroethylether (CF$_2$H(CF$_2$)$_3$CH$_2$OCF$_2$CF$_2$H).

Examples of fluorinated and non-fluorinated di-C$_1$-C$_4$-alkyl-C$_2$-C$_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether wherein one or more H of an alkyl or alkylene group may be substituted by F.

Examples of suitable fluorinated and non-fluorinated polyethers are polyalkylene glycols wherein one or more H of an alkyl or alkylene group may be substituted by F, preferably poly-C$_1$-C$_4$-alkylene glycols and especially polyethylene glycols. Polyethylene glycols may comprise up to 20 mol % of one or more C$_1$-C$_4$-alkylene glycols in copolymerized form. Polyalkylene glycols are preferably dimethyl- or diethyl-end-capped polyalkylene glycols. The molecular weight M$_w$ of suitable polyalkylene glycols and especially of suitable polyethylene glycols may be at least 400 g/mol. The molecular weight M$_w$ of suitable polyalkylene glycols and especially of suitable polyethylene glycols may be up to 5 000 000 g/mol, preferably up to 2 000 000 g/mol.

Examples of fluorinated ethers of formula R'—(O—CF$_p$H$_{2-p}$)$_q$—R" are 1,1,2,2-tetrafluoroethyl-2,2,3,3-tetrafluoropropyl ether (CF$_2$HCF$_2$CH$_2$OCF$_2$CF$_2$H), and 1H,1H,5H-perfluoropentyl-1,1,2,2-tetrafluoroethylether (CF$_2$H(CF$_2$)$_3$CH$_2$OCF$_2$CF$_2$H).

Examples of fluorinated and non-fluorinated cyclic ethers are 1,4-dioxane, tetrahydrofuran, and their derivatives like 2-methyl tetrahydrofuran wherein one or more H of an alkyl group may be substituted by F.

Examples of fluorinated and non-fluorinated acyclic acetals are 1,1-dimethoxymethane and 1,1-diethoxymethane. Examples of cyclic acetals are 1,3-dioxane, 1,3-dioxolane, and their derivatives such as methyl dioxolane wherein one or more H may be substituted by F.

Examples of fluorinated and non-fluorinated acyclic orthocarboxylic acid esters are tri-C$_1$-C$_4$ alkoxy methane, in particular trimethoxymethane and triethoxymethane wherein one or more H of an alkyl group may be substituted by F. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane wherein one or more H may be substituted by F.

Examples of fluorinated and non-fluorinated acyclic esters of carboxylic acids are ethyl and methyl formiate, ethyl and methyl acetate, ethyl and methyl proprionate, and ethyl and methyl butanoate, and esters of dicarboxylic acids like 1,3-dimethyl propanedioate wherein one or more H may be substituted by F. An example of a cyclic ester of carboxylic acids (lactones) is γ-butyrolactone. Examples of fluorinated and non-fluorinated diesters of carboxylic acids are malonic acid dialkyl esters like malonic acid dimethyl ester, succinic acid dialkyl esters like succinic acid dimethyl ester, glutaric acid dialkyl esters like glutaric acid dimethyl ester, and adipinic acid dialkyl esters like adipinic acid dimethyl ester, wherein one or more H of an alkyl group may be substituted by F.

Examples of fluorinated and non-fluorinated cyclic and acyclic sulfones are ethyl methyl sulfone, dimethyl sulfone, and tetrahydrothiophene-S,S-dioxide (sulfolane), wherein one or more H of an alkyl group may be substituted by F.

Examples of fluorinated and non-fluorinated cyclic and acyclic nitriles and dinitriles are adipodinitrile, acetonitrile, propionitrile, and butyronitrile wherein one or more H may be substituted by F.

Examples of fluorinated and non-fluorinated cyclic and acyclic phosphates are trialkyl phosphates wherein one or more H of an alkyl group may be substituted by F like trimethyl phosphate, triethyl phosphate, and tris(2,2,2-trifluoroethyl)phosphate.

More preferred the aprotic organic solvent(s) are selected from fluorinated and non-fluorinated ethers and polyethers, fluorinated and non-fluorinated cyclic and acyclic organic carbonates, fluorinated and non-fluorinated cyclic and acyclic esters and diesters of carboxylic acids and mixtures thereof. Even more preferred the aprotic organic solvent(s) are selected from fluorinated and non-fluorinated ethers and polyethers, and fluorinated and non-fluorinated cyclic and acyclic organic carbonates, and mixtures thereof.

According to another embodiment, the electrolyte composition contains at least one solvent selected from fluorinated cyclic carbonate like 1-fluoro ethyl carbonate.

According to another embodiment the electrolyte composition contains at least one fluorinated cyclic carbonate, e.g. 1-fluoro ethyl carbonate and at least one non-fluorinated acyclic organic carbonate, e.g. dimethyl carbonate, diethyl carbonate or ethyl methyl carbonate.

The inventive electrolyte composition contains at least one conducting salt (ii). The electrolyte composition functions as a medium that transfers ions participating in the electrochemical reaction taking place in an electrochemical cell. The conducting salt(s) (ii) present in the electrolyte are usually solvated in the aprotic organic solvent(s) (i). Preferably the conducting salt is a lithium salt.

The conducting salt(s) (ii) may be selected from the group consisting of
Li[F$_{6-x}$P(C$_y$F$_{2y+1}$)$_x$], wherein x is an integer in the range from 0 to 6 and y is an integer in the range from 1 to 20;
Li[B(R')4], Li[B(R')2(OR"O)] and Li[B(OR"O)2] wherein each R' is independently from each other selected from F, Cl, Br, I, C1-C4 alkyl, C2-C4 alkenyl, C2-C4 alkynyl, OC1-C4 alkyl, OC2-C4 alkenyl, and OC2-C4 alkynyl wherein alkyl, alkenyl, and alkynyl may be substituted by one or more OR''', wherein R''' is selected from C1-C6 alkyl, C2-C6 alkenyl, and C2-C6 alkynyl, and
(OR"O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;
LiClO$_4$; LiAsF$_6$; LiCF$_3$SO$_3$; Li$_2$SiF$_6$; LiSbF$_6$; LiAlCl$_4$; Li(N(SO$_2$F)$_2$), lithium tetrafluoro (oxalato) phosphate; lithium oxalate; and
salts of the general formula Li[Z(C$_n$F$_{2n+1}$SO$_2$)$_m$], where m and n are defined as follows:
m=1 when Z is selected from oxygen and sulfur,
m=2 when Z is selected from nitrogen and phosphorus,
m=3 when Z is selected from carbon and silicon, and
n is an integer in the range from 1 to 20.

Suited 1,2- and 1,3-diols from which the bivalent group (ORO) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated C$_1$-C$_4$ alkyl group. An example for such 1,2- or 1,3-diole is 1,1,2,2-tetra(trifluoromethyl)-1,2-ethane diol.

"Fully fluorinated C$_1$-C$_4$ alkyl group" means, that all H-atoms of the alkyl group are substituted by F.

Suited 1,2- or 1,3-dicarboxlic acids from which the bivalent group (OR"O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acids are optionally substituted by one or more F and/or by at least one straight or branched non-fluorinated, partly fluorinated or fully fluorinated C$_1$-C$_4$ alkyl group.

Suited 1,2- or 1,3-hydroxycarboxylic acids from which the bivalent group (OR"O) is derived may be aliphatic or aromatic, for example salicylic acid, tetrahydro salicylic acid, malic acid, and 2-hydroxy acetic acid, which are optionally substituted by one or more F and/or by at least one straight or branched non-fluorinated, partly fluorinated or fully fluorinated C$_1$-C$_4$ alkyl group. An example for such 1,2- or 1,3-hydroxycarboxylic acids is 2,2-bis(trifluoromethyl)-2-hydroxy-acetic acid.

Examples of Li[B(R')$_4$], Li[B(R')$_2$(OR"O)] and Li[B(OR"O)$_2$] are LiBF$_4$, lithium difluoro oxalato borate and lithium dioxalato borate.

Preferably the at least one conducting salt (ii) is selected from LiPF$_6$, LiAsF$_6$, LiSbF$_6$, LiCF$_3$SO$_3$, LiBF$_4$, lithium bis(oxalato) borate, lithium difluoro(oxalato) borate, LiClO$_4$, LiN(SO$_2$C$_2$F$_5$)$_2$, LiN(SO$_2$CF$_3$)$_2$, LiN(SO$_2$F)$_2$, and LiPF$_3$(CF$_2$CF$_3$)$_3$, more preferred LiPF$_6$, LiBF$_4$, and LiPF$_3$(CF$_2$CF$_3$)$_3$, more preferred the conducting salt is selected from LiPF$_6$ and LiBF$_4$, and the most preferred conducting salt is LiPF$_6$.

The at least one conducting salt is usually present at a minimum concentration of at least 0.1 m/l, preferably the concentration of the at least one conducting salt is 0.5 to 2 mol/l based on the entire electrolyte composition.

The electrolyte composition of the present invention contains at least one compound of formula (I) as component (iii)

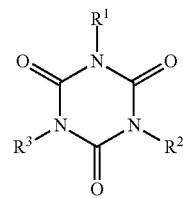

(I)

wherein
R$^1$, R$^2$, and R$^3$ are each independently H or a C$_1$-C$_{20}$ hydrocarbon group which may be unsubstituted or substituted by one or more substituents selected from F, CN, OS(O)$_2$F, and S(O)$_2$F and which may contain one or more groups selected from —O—, —S—, —C(O)O—, —OC(O)—, and —OS(O)$_2$—;

wherein at least one of R$^1$, R$^2$, and R$^3$ is substituted by one or more S(O)$_2$F groups.

R$^1$, R$^2$, and R$^3$ are each independently H or a C$_1$-C$_{20}$ hydrocarbon group, preferably R$^1$, R$^2$, and R$^3$ are each independently H or a C$_1$-C$_{12}$ hydrocarbon group; more preferred R$^1$, R$^2$, and R$^3$ are each independently H or a C$_1$-C$_6$ hydrocarbon group; and most preferred R$^1$, R$^2$, and R$^3$ are each independently H or a C$_1$-C$_4$ hydrocarbon group. In each case the hydrocarbon group may be unsubstituted or substituted by one or more substituents selected from F, CN, OS(O)$_2$F, and S(O)$_2$F and may contain one or more groups selected from —O—, —S—, —C(O)O—, —OC(O)—, and —OS(O)$_2$—.

The C$_1$-C$_{20}$ hydrocarbon group may inter alia be selected from independently at each occurrence from C$_1$-C$_{20}$ alkyl, C$_3$-C$_6$ cycloalkyl, C$_2$-C$_{20}$ alkenyl, C$_2$-C$_{20}$ alkynyl, C$_5$-C$_7$ aryl, and C$_6$-C$_{20}$ aralkyl.

The term "C$_1$-C$_{20}$ alkyl" as used herein means a straight or branched saturated hydrocarbon group with 1 to 20 carbon atoms having one free valence, e.g., methyl, ethyl, n-propyl, isopropyl, n-butyl, isobutyl, tert-butyl, n-pentyl, iso-pentyl, 2,2-dimethylpropyl, n-hexyl, 2-ethyl hexyl, n-heptyl, iso-heptyl, n-octyl, iso-octyl, n- and iso-nonyl, n- and iso-decyl, n- and iso-dodecyl, n- and iso-tetradecyl, n- and iso-hexadecyl, n- and iso-heptydecyl, n- and iso-octadecyl, and the like. Preferred C$_1$-C$_{12}$ alkyl, more preferred are C$_1$-C$_6$ alkyl, even more preferred are C$_1$-C$_4$ alkyl like methyl, ethyl, and n- and iso-propyl and most preferred are methyl and ethyl.

The term "C$_3$-C$_6$ (hetero)cycloalkyl" as used herein means a saturated 3- to 6-membered hydrocarbon cycle having one free valence wherein one or more of the C-atoms of the saturated cycle may be replaced independently from each other by a heteroatom selected from N, S, O and P. Examples of C$_3$ to C$_6$ cycloalkyl include cyclopropyl, cyclobutyl, cyclopentyl, and cyclohexyl, preferred is cyclohexyl. Examples of C$_3$ to C$_6$ hetero cycloalkyl are oxiranyl, tetrahydrofuryl, pyrrolidyl, piperidyl and morpholinyl.

The term "C$_2$-C$_{20}$ alkenyl" as used herein refers to an unsaturated straight or branched hydrocarbon group with 2 to 20 carbon atoms having one free valence. Unsaturated means that the alkenyl group contains at least one C—C double bond. C$_2$-C$_{20}$ alkenyl includes for example ethenyl, propenyl, 1-n-butenyl, 2-n-butenyl, iso-butenyl, 1-pentenyl, 1-hexenyl, 1-heptenyl, 1-octenyl, 1-nonenyl, 1-decenyl, 1-dodecenyl, 1-tetradecenyl, 1-hexadecenyl, 1-heptadecenyl, 1-octadecenyl, and the like. Preferred are C$_2$ to C$_{12}$ alkenyl groups, more preferred are C$_2$-C$_6$ alkenyl groups, even more preferred are C$_2$-C$_4$ alkenyl groups like ethenyl, propenyl, and butenyl most preferred is 1-propen-3-yl, also called allyl.

The term "C$_2$ to C$_{20}$ alkynyl" as used herein refers to an unsaturated straight or branched hydrocarbon group with 2 to 20 carbon atoms having one free valence, wherein the hydrocarbon group contains at least one C—C triple bond. C$_2$-C$_{20}$ alkynyl includes for example ethynyl, propynyl, 1-n-butinyl, 2-n-butinyl, iso-butinyl, 1-pentynyl, 1-hexynyl, 1-heptynyl, 1-octynyl, 1-nonynyl, 1-decynyl, 1-dodecynyl, 1-tetradecynyl, 1-hexadecynyl, 1-heptadecynyl, 1-octadecynyl, and the like. Preferred are C$_2$ to C$_{12}$ alkynyl, more preferred are C$_2$ to C$_6$ alkynyl, even more preferred are C$_2$-C$_4$ alkynyl, and most preferred are ethynyl and 1-propyn-3-yl (propargyl).

The term "C$_5$ to C$_7$ aryl" as used herein denotes an aromatic 5- to 7-membered hydrocarbon cycle having one free valence. An example of C$_5$-C$_7$ aryl is phenyl.

The term "C$_6$-C$_{20}$ aralkyl" as used herein denotes an aromatic 5- to 7-membered hydrocarbon cycle substituted by one or more C$_1$-C$_6$ alkyl. The C$_6$-C$_{20}$ aralkyl group contains in total 6 to 20 C-atoms and has one free valence. The free valence may be located in the aromatic cycle or in a C$_1$-C$_6$ alkyl group, i.e. C$_6$-C$_{20}$ aralkyl group may be bound via the aromatic part or via the alkyl part of the group. Examples of C$_6$-C$_{20}$ aralkyl are methylphenyl, 1,2-dimethylphenyl, 1,3-dimethylphenyl, 1,4-dimethylphenyl, ethylphenyl, 2-propylphenyl, and the like.

Preferably the C$_1$-C$_{20}$ hydrocarbon group is selected independently at each occurrence from C$_1$-C$_{12}$ alkyl, C$_3$-C$_6$ cycloalkyl, C$_2$-C$_{12}$ alkenyl, and C$_2$-C$_{12}$ alkynyl; more preferred from C$_1$-C$_{12}$ alkyl, C$_3$-C$_6$ cycloalkyl, and C$_2$-C$_{12}$ alkenyl; even more preferred from C$_1$-C$_{12}$ alkyl, and in particular preferred from C$_1$-C$_6$ alkyl.

The C$_1$-C$_{20}$ hydrocarbon group may be unsubstituted or substituted by one or more substituents selected from F, CN, OS(O)$_2$F, and S(O)$_2$F and may contain one or more groups selected from —O—, —S—, —C(O)O—, —OC(O)—, and —OS(O)$_2$—. Preferably the C$_1$-C$_{20}$ hydrocarbon group is unsubstituted or substituted by one or more substituents selected from F, CN, OS(O)$_2$F, and S(O)$_2$F, more preferred the C$_1$-C$_{20}$ hydrocarbon group is unsubstituted or substituted by one or more substituents selected from F, CN, and S(O)$_2$F. Examples of unsubstituted and substituted C$_1$-C$_{20}$ hydrocarbon group are methyl, ethyl, n-propyl, i-propyl, n-butyl, CF$_3$, CH$_2$CF$_3$, CF$_2$CF$_3$, CH$_2$CN, CH$_2$CH$_2$CN, (CH$_2$)$_3$CN, CH$_2$S(O)$_2$F, (CH$_2$)$_2$S(O)$_2$F, (CH$_2$)$_3$S(O)$_2$F, (CH$_2$)$_4$S(O)$_2$F, (CH$_2$)$_5$S(O)$_2$F, (CH$_2$)$_6$S(O)$_2$F, (CH$_2$)$_7$S(O)$_2$F, CH$_2$(CH)$_2$S(O)$_2$F, CH$_2$(CH)$_2$CH$_2$S(O)$_2$F, (CH$_2$)$_2$(CH)$_2$S(O)$_2$F, C$_2$S(O)$_2$F, CH$_2$C$_2$S(O)$_2$F, CH$_2$C$_2$CH$_2$S(O)$_2$F, and

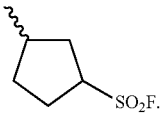

At least one of R$^1$, R$^2$, and R$^3$ is substituted by one or more S(O)$_2$F groups, preferably at least two of R$^1$, R$^2$, and R$^3$ are substituted by one or more S(O)$_2$F groups and more preferred each of R$^1$, R$^2$, and R$^3$ is substituted by one or more S(O)$_2$F groups.

Examples of C$_1$-C$_{20}$ hydrocarbon groups substituted by one or more S(O)$_2$F groups are CH$_2$S(O)$_2$F, (CH$_2$)$_2$S(O)$_2$F, (CH$_2$)$_3$S(O)$_2$F, (CH$_2$)$_4$S(O)$_2$F, (CH$_2$)$_5$S(O)$_2$F, (CH$_2$)$_6$S(O)$_2$F, CH(S(O)$_2$F)CH$_3$, CH$_2$CH(S(O)$_2$F)CH$_3$, CH$_2$CH$_2$CH(S(O)$_2$F)CH$_3$, CH$_2$CH$_2$CH$_2$CH(S(O)$_2$F)CH$_3$, CH$_2$CH(S(O)$_2$F)CH$_2$CH$_2$S(O)$_2$F), (CH)$_2$S(O)$_2$F, CH$_2$(CH)$_2$S(O)$_2$F, CH$_2$(CH)$_2$CH$_2$S(O)$_2$F, (CH$_2$)$_2$(CH)$_2$S(O)$_2$F, C$_2$S(O)$_2$F, CH$_2$C$_2$S(O)$_2$F, CH$_2$C$_2$CH$_2$S(O)$_2$F, and

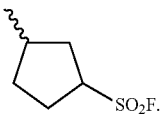

Preferred C$_1$-C$_{20}$ hydrocarbon groups substituted by one or more S(O)$_2$F groups are (CH$_2$)$_n$S(O)$_2$F, wherein n is independently at each occurrence an integer from 1 to 12 and one or more hydrogen of the $(CH_2)_n$ chain may be replaced by F, CN, $OS(O)_2F$ and/or $S(O)_2F$ and wherein one or more $CH_2$ groups of the $(CH_2)_n$ chain which are not directly connected to the N-atom or the $S(O)_2F$ group may be replaced by —O—, —C(O)O—, —OC(O)—, and/or —OS$(O)_2$—. Preferably n is an integer from 1 to 6, e.g. 1, 2, 3, 4, 5 or 6.

Preferably $R^1$, $R^2$, and $R^3$ are selected independently from H and $C_1$-$C_{12}$ alkyl which may be substituted by one or more $S(O)_2F$ groups, more preferred are compounds of formula (I) wherein $R^1$, $R^2$, and $R^3$ are selected independently from H and $C_1$-$C_6$ alkyl which may be substituted by one or more $S(O)_2F$ groups; and even more preferred are compounds of formula (I) wherein $R^1$, $R^2$, and $R^3$ are each independently selected from $C_1$-$C_6$ alkyl substituted by one or more $S(O)_2F$ groups.

According to one embodiment at least one of $R^1$, $R^2$, and $R^3$ is $(CH_2)_nS(O)_2F$, wherein n is independently at each occurrence an integer from 1 to 12 and wherein one or more hydrogen of the $(CH_2)_n$ chain may be replaced by F, CN, $OS(O)_2F$ and/or $S(O)_2F$ and wherein one or more $CH_2$ groups of the $(CH_2)_n$ chain which are not directly connected to the N-atom or the $S(O)_2F$ group may be replaced by —O—, —C(O)O—, —OC(O)—, and/or —OS$(O)_2$—; more preferred at least two of $R^1$, $R^2$, and $R^3$ are $(CH_2)_nS(O)_2F$, wherein n is independently at each occurrence an integer from 1 to 12 and one or more hydrogen of the $(CH_2)_n$ chain may be replaced by F, CN, $OS(O)_2F$ and/or $S(O)_2F$ and wherein one or more $CH_2$ groups of the $(CH_2)_n$ chain which are not directly connected to the N-atom or the $S(O)_2F$ group may be replaced by —O—, —C(O)O—, —OC(O)—, and/or —OS$(O)_2$—; and most preferred each of $R^1$, $R^2$, and $R^3$ is $(CH_2)_nS(O)_2F$, wherein n is independently at each occurrence an integer from 1 to 12 and one or more hydrogen of the $(CH_2)_n$ chain may be replaced by F, CN, $OS(O)_2F$ and/or $S(O)_2F$ and wherein one or more $CH_2$ groups of the $(CH_2)_n$ chain which are not directly connected to the N-atom or the $S(O)_2F$ group may be replaced by —O—, —C(O)O—, —OC(O)—, and/or —OS$(O)_2$—.

Preferred compounds of formula (I) are compounds of formula (II)

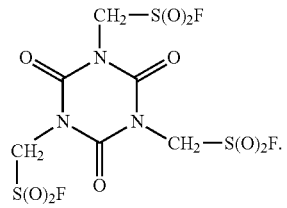

(II)

wherein n is independently at each occurrence 1, 2, 3, 4, 5 or 6.

Examples of compounds of formulae (I) and (II) are

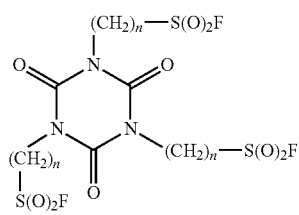

(II.1)

and

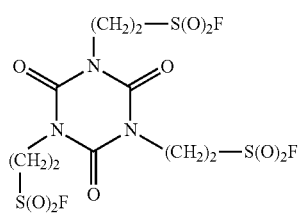

(II.2)

The preparation of the compounds of formula (I) is known to the person skilled in the art. The compounds of formula (I) may be prepared as described in Krutak, J. J. et al., J. Org. Chem., Vol. 44, 1979, pages 3847-3858.

Usually the electrolyte composition contains in total at least 0.01 wt.-% of the compound(s) of formula (I), based on the total weight of electrolyte composition, preferably at least 0.05 wt.-%, and more preferred at least 0.1 wt.-%, based on the total weight of electrolyte composition. The upper limit of the total concentration of compound(s) of formula (I) in the electrolyte composition is usually 10 wt.-%, based on the total weight of electrolyte composition, preferably 5 wt.-%, and more preferred the upper limit of the total concentration of the compound(s) of formula (I) is 3 wt.-%, based on the total weight of electrolyte composition. Usually the electrolyte composition contains in total 0.01 to 10 wt.-%, of the compound(s) of formula (I), based on the total weight of electrolyte composition, preferably 0.05 to 5 wt.-%, and more preferably 0.1 to 3 wt.-%.

A further object of the present invention is the use of compounds of formula (I) in electrochemical cells, e.g. in the electrolyte composition used in the electrochemical cell. In the electrolyte composition the compounds of formula (I) are usually used as additive, preferably as film forming additives and/or as anti-gassing additives. Preferably the compounds of formula (I) are used in lithium batteries, e.g. as additive for electrolyte compositions, more preferred in lithium ion batteries, even more preferred in electrolyte compositions for lithium ion batteries.

If the compounds of formula (I) are used as additives in the electrolyte compositions, they are usually added in the desired amount to the electrolyte composition. They are usually used in the electrolyte composition in the concentrations described above and as described as preferred.

The electrolyte composition according to the present invention optionally contains at least one further additive (iv). The additive(s) (iv) may be selected from SEI forming additives, flame retardants, overcharge protection additives, wetting agents, HF and/or $H_2O$ scavenger, stabilizer for $LiPF_6$ salt, ionic solvation enhancer, corrosion inhibitors, gelling agents, and the like. The one or more additives (iv) are different from the compounds of formula (I). The electrolyte composition may contain at least one additive (iv) or two, three or more.

Examples of flame retardants are organic phosphorous compounds like cyclophosphazenes, organic phosphoramides, organic phosphites, organic phosphates, organic phosphonates, organic phosphines, and organic phosphinates, and fluorinated derivatives thereof.

Examples of cyclophosphazenes are ethoxypentafluorocyclotriphosphazene, available under the trademark Phoslyte™ E from Nippon Chemical Industrial, hexamethylcyclotriphosphazene, and hexamethoxycyclotriphosphazene, preferred is ethoxypentafluorocyclotriphosphazene. An example of an organic phosphoramide is hexamethyl phosphoramide. An example of an organic phosphite is tris(2,2, 2-trifluoroethyl) phospite. Examples of organic phosphates are trimethyl phosphate, trimethyl phosphate, tris(2,2,2-trifluoroethyl)phosphate, bis(2,2,2-trifluoroethyl)methyl phosphate, and triphenyl phosphate Examples of organic phosphonates are dimethyl phosphonate, ethyl methyl phosphonate, methyl n-propyl phosphonate, n-butyl methyl phosphonate, diethyl phosphonate, ethyl n-proply phosphonate, ethyl n-butyl phosphonate, di-n-propyl phosphonate, n-butyl n-propyl phosphonate, di-n-butyl phosphonate, and bis(2,2,2-trifluoroethyl) methyl phosphonate. An example of an organic phosphine is triphenyl phosphine. Examples of organic phosphinates are dimethyl phosphonate, diethyl phosphinate, di-n-propyl phosphinate, trimethyl phosphinate, trimethyl phosphinate, and tri-n-propyl phosphinate.

Examples of HF and/or $H_2O$ scavenger are optionally halogenated cyclic and acyclic silylamines.

Examples of overcharge protection additives are cyclohexylbenzene, o-terphenyl, p-terphenyl, and biphenyl and the like, preferred are cyclohexylbenzene and biphenyl.

Examples of gelling agents are polymers like polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. These polymers are added to the electrolytes in order to convert liquid electrolytes into quasi-solid or solid electrolytes and thus to improve solvent retention, especially during ageing.

SEI-forming additives are film forming additives. An SEI forming additive according to the present invention is a compound which decomposes on an electrode to form a passivation layer on the electrode which prevents degradation of the electrolyte and/or the electrode. In this way, the lifetime of a battery is significantly extended. Preferably the SEI forming additive forms a passivation layer on the anode. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a metal counter electrode, and an electrolyte containing a small amount of said compound, typically from 0.1 to 10 wt.-% of the electrolyte composition, preferably from 0.2 to 5 wt.-% of the electrolyte composition. Upon application of a voltage between anode and lithium metal, the differential capacity of the electrochemical cell is recorded between 0.5 V and 2 V. If a significant differential capacity is observed during the first cycle, for example −150 mAh/V at 1 V, but not or essentially not during any of the following cycles in said voltage range, the compound can be regarded as SEI forming additive. SEI forming additives are known to the person skilled in the art.

According to one embodiment the electrolyte composition contains at least one SEI forming additive. More preferred the electrolyte composition contains at least one SEI forming selected from cyclic carbonates containing at least one double bond; fluorinated ethylene carbonates and its derivatives; cyclic esters of sulfur containing acids; oxalate containing compounds; and sulfur containing additives as described in detail in WO 2013/026854 A1, in particular the sulfur containing additives shown on page 12 line 22 to page 15, line 10.

The cyclic carbonates containing at least one double bond include cyclic carbonates wherein a double bond is part of the cycle like vinylene carbonate and its derivatives, e.g. methyl vinylene carbonate and 4,5-dimethyl vinylene carbonate; and cyclic carbonate wherein the double bond is not part of the cycle, e.g. methylene ethylene carbonate, 4,5-dimethylene ethylene carbonate, vinyl ethylene carbonate, and 4,5-divinyl ethylene carbonate. Preferred cyclic carbonates containing at least one double bond are vinylene carbonate, methylene ethylene carbonate, 4,5-dimethylene ethylene carbonate, vinyl ethylene carbonate, and 4,5-divinyl ethylene carbonate, most preferred is vinylene carbonate.

Examples of cyclic esters of sulfur containing acids include cyclic esters of sulfonic acid like propane sultone and its derivatives, methylene methane disulfonate and its derivatives, and propene sultone and its derivatives; and cyclic esters derived from sulfurous acid like ethylene sulfite and its derivatives. Preferred cyclic esters of sulfur containing acids are propane sultone, propene sultone, methylene methane disulfonate, and ethylene sulfite.

Oxalate comprising compounds include oxalates such as lithium oxalate; oxalato borates like lithium dimethyl oxalato borate and salts comprising a bis(oxalato)borate anion or a difluoro oxalato borate anion like lithium bis(oxalate) borate, lithium difluoro (oxalato) borate, ammonium bis(oxalato) borate, and ammonium difluoro (oxalato) borate; and oxalato phosphates including lithium tetrafluoro (oxalato) phosphate and lithium difluoro bis(oxalato) phosphate. Preferred oxalate comprising compounds for use as film forming additive are lithium bis(oxalato) borate and lithium difluoro (oxalato) borate.

Preferred SEI-forming additives are oxalato borates, fluorinated ethylene carbonates and its derivatives, cyclic carbonates containing at least one double bond, cyclic esters of sulfur containing acids, and the sulfur containing additives as described in detail in WO 2013/026854 A1. More preferred the electrolyte composition contains at least one additive selected from cyclic carbonates containing at least one double bond, fluorinated ethylene carbonate and its derivatives, cyclic esters of sulfur containing acids, and oxalato borates, even more preferred are oxalato borates, fluorinated ethylene carbonates and its derivatives, and cyclic carbonates containing at least one double bond. Particularly preferred SEI-forming additives are lithium bis(oxalato) borate, lithium difluoro oxalato borate, vinylene carbonate, methylene ethylene carbonate, vinylethylene carbonate, and monofluoroethylene carbonate.

If the electrolyte composition contains a SEI forming additive (iv) it is usually present in a concentration of from 0.1 to 10 wt.-%, preferably of from 0.2 to 5 wt.-% of the electrolyte composition.

A compound added as additive (iv) may have more than one effect in the electrolyte composition and the device comprising the electrolyte composition. E.g. lithium oxalato borate may be added as additive enhancing the SEI formation but it may also be added as conducting salt.

According to one embodiment of the present invention the electrolyte composition contains at least one additive (iv). The minimum total concentration of the further additive(s) (iv) is usually 0.005 wt.-%, preferably the minimum concentration is 0.01 wt.-% and more preferred the minimum concentration is 0.1 wt.-%, based on the total weight of electrolyte composition. The maximum total concentration of the additive(s) (iv) is usually 25 wt.-%, based on the total weight of electrolyte composition.

A preferred electrolyte composition contains (i) at least 74.99 wt.-% of at least one organic aprotic solvent;

(ii) 0.1 to 25 wt.-% of at least one conducting salt;

(iii) 0.01 to 10 wt.-% of at least one compound of formula (I); and (iv) 0 to 25 wt.-% of at least one additive, based on the total weight of the electrolyte composition.

The electrolyte composition is preferably non-aqueous. In one embodiment of the present invention, the water content of the electrolyte composition is preferably below 100 ppm, based on the weight of the respective inventive formulation, more preferred below 50 ppm, most preferred below 30 ppm. The water content may be determined by titration according to Karl Fischer, e.g. described in detail in DIN 51777 or ISO760: 1978.

In one embodiment of the present invention, the HF-content of the electrolyte composition is preferably below 100 ppm, based on the weight of the respective inventive formulation, more preferred below 50 ppm, most preferred below 30 ppm. The HF content may be determined by titration.

The electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C. Such liquid electrolyte compositions are particularly suitable for outdoor applications, for example for use in automotive batteries.

The electrolyte compositions of the invention are prepared by methods which are known to the person skilled in the field of the production of electrolytes, generally by dissolving the conductive salt(s) (ii) in the corresponding mixture of solvent(s) (i) and adding one or more compounds of formula (I) (iii) and optionally one or more additives (iv), as described above.

The electrolyte compositions may be used in electrochemical cells, preferred they are used in a lithium battery, a double layer capacitor, or a lithium ion capacitor, more preferred they are used in lithium batteries, even more preferred in secondary lithium cells and most preferred in secondary lithium ion batteries.

Another aspect of the invention are electrochemical cells comprising the electrolyte as described above or as described as preferred.

The electrochemical cell usually comprises (A) an anode comprising at least one anode active material, (B) a cathode comprising at least one cathode active material; and (C) the electrolyte composition as described above.

The electrochemical cell may be a lithium battery, a double layer capacitor, or a lithium ion capacitor. The general construction of such electrochemical cell is known and is familiar to the person skilled in this art—for batteries, for example, in Linden's Handbook of Batteries (ISBN 978-0-07-162421-3).

Preferably the electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds; e.g. the lithium battery may be a lithium ion battery, a lithium/sulphur battery, or a lithium/selenium sulphur battery. The lithium battery is preferably a secondary lithium battery, i.e. a rechargeable lithium battery.

In particular preferred the electrochemical device is a lithium ion battery, i.e. a secondary lithium ion electrochemical cell comprising a cathode comprising a cathode active material that can reversibly occlude and release lithium ions and an anode comprising an anode active material that can reversibly occlude and release lithium ions.

The electrochemical cell comprises a cathode (B) comprising at least one cathode active material. The at least one cathode active material comprises a material capable of occluding and releasing lithium ions and may be selected from lithium transition metal oxides and lithium transition metal phosphates of olivine structure. A compound or material occluding and releasing lithium ion is also called lithium ion intercalating compound.

Examples of lithium transition metal phosphates are $LiFePO_4$, $LiNiPO_4$, $LiMnPO_4$, and $LiCoPO_4$; examples of lithium ion intercalating lithium transition metal oxides are $LiCoO_2$, $LiNiO_2$, $LiMnO_2$, mixed lithium transition metal oxides with layer structure, manganese containing spinels, and lithium intercalating mixed oxides of Ni, Al and at least one second transition metal.

Examples of mixed lithium transition metal oxides which contain Mn and at least one second transition metal are lithium transition metal oxides with layered structure of formula (II)

$$Li_{1+e}(Ni_aCo_bMn_cM_d)_{1-e}O_2 \quad (II)$$

wherein a is in the range of from 0.05 to 0.9, preferred in the range of 0.1 to 0.8, b is in the range of from zero to 0.35, c is in the range of from 0.1 to 0.9, preferred in the range of 0.2 to 0.8, d is in the range of from zero to 0.2, e is in the range of from zero to 0.3, preferred in the range of >zero to 0.3, more preferred in the range of 0.05 to 0.3, with a+b+c+d=1, and M being one or more metals selected from Na, K, Al, Mg, Ca, Cr, V, Mo, Ti, Fe, W, Nb, Zr, and Zn.

Cobalt containing compounds of formula (II) are also named NCM.

Mixed lithium transition metal oxides with layered structure of formula (II) wherein e is larger than zero are also called overlithiated.

Preferred mixed lithium transition metal oxides with layered structure of formula (II) are compounds forming a solid solution wherein a LiM'O$_2$ phase in which M' is Ni, and optionally one or more transition metals selected from Co and Mn and a $Li_2MnO_3$ phase are mixed and wherein one or more metal M as defined above may be present. The one or more metals M are also called "dopants" or "doping metal" since they are usually present at minor amounts, e.g. at maximum 10 mol-% M or at maximum 5 mol-% M or at maximum 1 mol.-% based on the total amount of metal except lithium present in the transition metal oxide. In case one or more metals M are present, they are usually present in an amount of at least 0.01 mol-% or at least 0.1 mol-% based on the total amount of metal except lithium present in the transition metal oxide. These compounds are also expressed by formula (IIa)

$$zLiM'O_2 \cdot (1-z)Li_2MnO_3 \quad (IIa)$$

wherein M' is Ni and at least one metal selected from Mn and Co;

z is 0.1 to 0.8, and wherein one or more metals selected from Na, K, Al, Mg, Ca, Cr, V, Mo, Ti, Fe, W, Nb, Zr, and Zn may be present.

Electrochemically, the Ni and if present Co atoms in the LiM'O$_2$ phase participate in reversible oxidation and reduction reactions leading to Li-ions deintercalation and intercalation, respectively, at voltages below 4.5 V vs. Li$^+$/Li, while the Li$_2$MnO$_3$ phase participates only in oxidation and reduction reactions at voltages equal or above 4.5 V vs. Li$^+$/Li given that Mn in the Li$_2$MnO$_3$ phase is in its +4 oxidation state. Therefore, electrons are not removed from the Mn atoms in this phase but from the 2p orbitals of oxygen ions, leading to the removal of oxygen for the lattice in the form of O$_2$ gas at least in the first charging cycling.

These compounds are also called HE-NCM due to their higher energy densities in comparison to usual NCMs. Both HE-NCM and NCM have operating voltages of about 3.0 to 3.8 V against Li/Li$^+$, but high cut off voltages have to be used both for activating and cycling of HE-NCMs to actually accomplish full charging and to benefit from their higher energy densities. Usually the upper cut-off voltage for the cathode during charging against Li/Li$^+$ is of at least 4.5 V for activating the HE-NCM, preferably of at least 4.6 V, more preferred of at least 4.7 V and even more preferred of at least 4.8 V. The term "upper cut-off voltage against Li/Li$^+$ during charging" of the electrochemical cell means the voltage of the cathode of the electrochemical cell against a Li/Li$^+$ reference anode which constitute the upper limit of the voltage at which the electrochemical cell is charged. Examples of HE-NCMs are 0.33Li$_2$MnO$_3$.0.67Li(Ni$_{0.4}$Co$_{0.2}$Mn$_{0.4}$)O$_2$,
0.42Li$_2$MnO$_3$.0.58Li(Ni$_{0.4}$Co$_{0.2}$Mn$_{0.4}$)O$_2$,
0.50Li$_2$MnO$_3$.0.50Li(Ni$_{0.4}$Co$_{0.2}$Mn$_{0.4}$)O$_2$,
0.40Li$_2$MnO$_3$.0.60Li(Ni$_{0.8}$Co$_{0.1}$Mn$_{0.4}$)O$_2$, and
0.42Li$_2$MnO$_3$.0.58Li(Ni$_{0.6}$Mn$_{0.4}$)O$_2$.

Examples of manganese-containing transition metal oxides with layer structure of formula (II) wherein d is zero are LiNi$_{0.33}$Mn$_{0.67}$O$_2$, LiNi$_{0.25}$Mn$_{0.75}$O$_2$, LiNi$_{0.35}$Co$_{0.15}$Mn$_{0.5}$O$_2$, LiNi$_{0.21}$Co$_{0.08}$Mn$_{0.71}$O$_2$, LiNi$_{0.22}$Co$_{0.12}$Mn$_{0.66}$O$_2$, LiNi$_{0.8}$Co$_{0.1}$Mn$_{0.1}$O$_2$, LiNi$_{0.6}$Co$_{0.2}$Mn$_{0.2}$O$_2$, and LiNi$_{0.5}$Co$_{0.2}$Mn$_{0.3}$O$_2$. It is preferred that the transition metal oxides of general formula (II) wherein d is zero do not contain further cations or anions in significant amounts.

Examples of manganese-containing transition metal oxides with layer structure of formula (II) wherein d is larger than zero are 0.33Li$_2$MnO$_3$.0.67Li(Ni$_{0.4}$Co$_{0.2}$Mn$_{0.4}$)O$_2$, 0.42Li$_2$MnO$_3$.0.58Li(Ni$_{0.4}$Co$_{0.2}$Mn$_{0.4}$)O$_2$, 0.50Li$_2$MnO$_3$.0.50Li(Ni$_{0.4}$Co$_{0.2}$Mn$_{0.4}$)O$_2$, 0.40Li$_2$MnO$_3$.0.60Li(Ni$_{0.8}$Co$_{0.1}$Mn$_{0.1}$)O$_2$ and 0.42Li$_2$MnO$_3$.0.58Li(Ni$_{0.6}$Mn$_{0.4}$)O$_2$ wherein one or more metal M selected from Na, K, Al, Mg, Ca, Cr, V, Mo, Ti, Fe, W, Nb, Zr, and Zn may be present. The one or more doping metal is preferably present up to 1 mol-%, based on the total amount of metal except lithium present in the transition metal oxide.

Other preferred compounds of formula (II) are Ni-rich compounds, wherein the content of Ni is at least 50 mol. % based on the total amount of transition metal present. This includes compounds of formula (IIb)

   (IIb)

wherein
a is in the range of from 0.5 to 0.9, preferred in the range of 0.5 to 0.8,
b is in the range of from zero to 0.35,
c is in the range of from 0.1 to 0.5, preferred in the range of 0.2 to 0.5,
d is in the range of from zero to 0.2,
e is in the range of from zero to 0.3,
with a+b+c+d=1, and
M being one or more metals selected from Na, K, Al, Mg, Ca, Cr, V, Mo, Ti, Fe, W, Nb, Zr, and Zn.

Examples of Ni-rich compounds of formula (IIb) are Li[Ni$_{0.8}$Co$_{0.1}$Mn$_{0.1}$]O$_2$ (NCM 811), Li[Ni$_{0.6}$Co$_{0.2}$Mn$_{0.2}$]O$_2$ (NCM 622), and Li[Ni$_{0.5}$Co$_{0.2}$Mn$_{0.3}$]O$_2$ (NCM 523).

Further examples of mixed lithium transition metal oxides containing Mn and at least one second transition metal are manganese-containing spinels of formula (III)

   (III)

wherein
s is 0 to 0.4,
t is 0 to 0.4, and
M is Mn and at least one further metal selected from Co and Ni, preferably M is Mn and Ni and optionally Co, i.e. a part of M is Mn and another part of Ni, and optionally a further part of M is selected from Co.

The cathode active material may also be selected from lithium intercalating mixed oxides containing Ni, Al and at least one second transition metal, e.g. from lithium intercalating mixed oxides of Ni, Co and Al. Examples of mixed oxides of Ni, Co and Al are compounds of formula (IV)

   (IV)

wherein
h is 0.7 to 0.9, preferred 0.8 to 0.87, and more preferred 0.8 to 0.85;
i is 0.15 to 0.20; and
j is 0.02 to 10, preferred 0.02 to 1, more preferred 0.02 to 0.1, and most preferred 0.02 to 0.03.

The cathode active material may also be selected from LiMnPO$_4$, LiNiPO$_4$ and LiCoPO$_4$. These phosphates show usually olivine structure. Usually upper cut-off voltages of at least 4.5 V have to be used for charging these phosphates.

Preferably the at least one cathode active material is selected from mixed lithium transition metal oxides containing Mn and at least one second transition metal; lithium intercalating mixed oxides containing Ni, Al and at least one second transition metal; LiMnPO$_4$; LiNiPO$_4$; and LiCoPO$_4$.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

The anode comprised within the lithium batteries of the present invention comprises an anode active material that can reversibly occlude and release lithium ions or is capable to form an alloy with lithium. For example, carbonaceous material that can reversibly occlude and release lithium ions can be used as anode active material. Carbonaceous materials suited are crystalline carbon materials such as graphite materials like natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber.

Further anode active materials are lithium metal and materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, tin (Sn), lead (Pb), aluminum (Al), indium (In), zinc (Zn), antimony (Sb), bismuth (Bi), gallium (Ga), germanium (Ge), arsenic (As), silver (Ag), hafnium (Hf), zirconium (Zr), yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material are silicon based materials. Silicon based materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector. Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti, e.g. $Li_5Ti_5O_{12}$.

Preferably the anode active material is selected from carbonaceous material that can reversibly occlude and release lithium ions, particular preferred are graphite materials. In another preferred embodiment the anode active is selected from silicon based materials that can reversibly occlude and release lithium ions, preferably the anode comprises a $SiO_x$ material or a silicon/carbon composite. In a further preferred embodiment the anode active is selected from lithium ion intercalating oxides of Ti.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive lithium batteries may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin separators.

Several inventive lithium batteries may be combined with one another, for example in series connection or in parallel connection. Series connection is preferred. The present invention further provides for the use of inventive lithium ion batteries as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive lithium ion batteries can also be used for stationary energy stores.

Even without further statements, it is assumed that a skilled person is able to utilize the above description in its widest extent. Consequently, the preferred embodiments and examples are to be interpreted merely as a descriptive enclosure which in no way has any limiting effect at all.

I. PREPARATION OF ADDITIVES

C. 1

To a solution of Ethenesulfonyl fluoride (22.2 g, 200 mmol, 1.0 eq) and Succinimide (20.2 g, 200 mmol, 1.0 eq) in ethanol (EtOH) (800 ml) was added sodium acetate (AcONa) (3.33 g, 40.0 mmol, 0.2 eq) at ice bath temperature, and the mixture was stirred at room temperature for 30 min. The obtained suspension was quenched with water, extracted with ethyl acetate (EtOAc), washed with bine, and dried over anhydrous Na2SO4. The solvent was removed under reduced pressure and the crude product was purified by silica gel chromatography (hexanes/EtOAc) to give the product as a white solid (35.6 g, 84% yield).

C. 2

To a solution of Ethenesulfonyl fluoride (11.1 g, 100 mmol, 1.0 eq) and 1-Methylhydantoin (11.5 g, 100 mmol, 1.0 eq) in EtOH (400 ml) was added AcONa (1.67 g, 20.0 mmol, 0.2 eq) at ice bath temperature, and the mixture was stirred at room temperature for 15 h. The obtained suspension was quenched with water, extracted with EtOAc, washed with bine, and dried over anhydrous Na2SO4. The solvent was removed under reduced pressure and the crude product was purified by silica gel chromatography (hexanes/EtOAc) to give the product as a white solid (19.6 g, 86% yield).

II. 1

To a solution of Ethenesulfonyl fluoride (70.8 g, 569 mmol, 3.0 eq) and Cyanuric acid (25.0 g, 189 mmol, 1.0 eq)

in EtOH (950 ml) was added AcONa (15.8 g, 190 mmol, 1.0 eq) at ice bath temperature, and the mixture was stirred at room temperature for 15 h. The obtained suspension was filtrated, and washed by water, EtOH and diethyl ether (Et2O). The product was dried over reduced pressure resulting in a white solid (81.6 g, 93% yield).

C. 3

To a solution of Tris(2-hydroxyethyl) Isocyanurate (25.0 g, 93 mmol, 1.0 eq) and Triethylamine (29.5 g, 288 mmol, 3.1 eq) in CH2Cl2 (400 ml) was added Methanesulfonyl Chloride (33.4 g, 288 mmol, 3.1 eq) at ice bath temperature, and the mixture was stirred at room temperature for 15 h. The obtained suspension was filtrated and washed by CH2Cl2. The solid was purified by silica gel chromatography (hexanes/EtOAc) to give the product as a white solid (2.7 g, 6% yield).

The additives are summarized in Table 1.

(compound C.3). The exact compositions are summarized in Table 2. In Table 2 concentrations are given as wt.-% based on the total weight of the electrolyte composition.

III. ELECTROCHEMICAL CELLS

III.1 Silicon Suboxide/Graphite Anodes

Silicon suboxide, graphite and carbon black were thoroughly mixed. CMC (carboxymethyl cellulose) aqueous solution and SBR (styrene butadiene rubber) aqueous solution were used as binder. The mixture of silicon oxide, graphite and carbon black was mixed with the binder solutions and an adequate amount of water was added to prepare a suitable slurry for electrode preparation. The thus obtained slurry was coated by using a roll coater onto copper foil (thickness=18 μm) and dried under ambient temperature. The sample loading for electrodes on Cu foil was fixed to be 5 mg cm$^{-2}$.

TABLE 1

Additives

| Compound | | |
|---|---|---|
| Comparative 1 (C. 1) | 2-Succinimido-ethanesulfonyl fluoride | |
| Comparative 2 (C. 2) | 2-(1'-Methylhydantoyl)-ethanesulfonyl fluoride | |
| (II. 1) | 3,3',3''-(2,4,6-trioxo-[1,3,5]triazinane-1,3,5-triyl)-tris-ethanesulfonyl fluoride | |
| Comparative 3 (C. 3) | 1,3,5-tris(2-methanesulfonylethyl) 1,3,5-triazine-2,4,6-trione | |

II. ELECTROLYTE COMPOSITIONS

A base electrolyte composition was prepared containing 12.7 wt % of LiPF$_6$, 26.2 wt % of ethylene carbonate (EC), and 61.1 wt % of ethyl methyl carbonate (EMC) (EL base 1), based on the total weight of EL base 1. To this EL base 1 formulation 10 wt % FEC was added (EL base 2). To this EL base 2 formulation different amounts of additives were added. The amounts of the additives were calculated to result in electrolyte samples containing 1 mol/L SO$_2$F groups (for compounds C.1, C.2 and II.1) or OSO$_2$CH$_3$ III.2 Fabrication of the Test Cells Coin-type half cells (20 mm in diameter and 3.2 mm in thickness) comprising a silicon suboxide/graphite composite anode prepared as described above and lithium metal as working and counter electrode, respectively, were assembled and sealed in an Ar-filled glove box. In addition, the cathode and anode described above and a separator were superposed in order of anode//separator//Li foil to produce a half coin cell. Thereafter, 0.15 mL of the different nonaqueous electrolyte compositions were introduced into the coin cell.

IV TESTING OF THE CELLS

Cycle Stability of Coin Halfcells Comprising Silicon Suboxide/Graphite Composite Anode The coin half cells prepared according to III were tested in a voltage range between 1 V to 0.03 V at room temperature. For the initial 2 cycles, the initial lithiation was conducted in the CC-CV mode, i.e., a constant current (CC) of 0.05 C was applied until reaching 0.01 C. After 5 min resting time, oxidative delithiation was carried out at constant current of 0.05 C up to 1 V. For the cycling, the current density increased to 0.5 C. The results are summarized in Table 2. [%] capacity retention after 230 cycles is based on the capacity retention after the second cycle.

TABLE 2

Cycle stability of coin halfcells comprising silicon suboxide/graphite anode at room temperature

| Electrolyte Sample | Additive | EL base 2 [wt.-%] | Additive concentration [wt.-%] | Capacity retention after 20 cyc [%] at 25° C. | Cycle Retention after 230 cyc [%] at 25° C. |
|---|---|---|---|---|---|
| 1 (comparative) | C.1 | 98.0 | 2.0 | 99.7 | 85 |
| 2 (comparative) | C.2 | 97.9 | 2.1 | 99.5 | 56 |
| 3 (inventive) | II.I | 98.5 | 1.5 | 99.3 | 91 |
| 4 (comparative) | C.3 | 98.4 | 1.6 | 99.3 | 73 |
| 5 (comparative) | none | 100.0 | 0 | 99.6 | 80 |

What is claimed is:

1. An electrolyte composition comprising:
(i) at least one aprotic organic solvent;
(ii) at least one conducting salt;
(iii) at least one compound of formula (I)

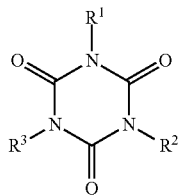

(I)

wherein
$R^1$, $R^2$, and $R^3$ may each independently be H or a $C_1$-$C_{20}$ hydrocarbon group which may be unsubstituted or substituted by one or more substituents selected from the group consisting of F, CN, $OS(O)_2F$, and $S(O)_2F$ and which may comprise one or more groups selected from the group consisting of —O—, —S—, —C(O)O—, —OC(O)—, and —OS(O)$_2$—;
wherein at least two of $R^1$, $R^2$, and $R^3$ are substituted by one or more $S(O)_2F$ groups; and
(iv) optionally one or more additives.

2. The electrolyte composition according to claim 1, wherein each of $R^1$, $R^2$, and $R^3$ is substituted by one or more $S(O)_2F$ groups.

3. The electrolyte composition according to claim 1, wherein the $C_1$-$C_{20}$ hydrocarbon group is selected independently at each occurrence from the group consisting of $C_1$-$C_{20}$ alkyl, $C_3$-$C_6$ cycloalkyl, $C_2$-$C_{20}$ alkenyl, $C_2$-$C_{20}$ alkynyl, $C_5$-$C_7$ aryl, and $C_6$-$C_{20}$ aralkyl.

4. The electrolyte composition according to claim 1, wherein the $C_1$-$C_{20}$ hydrocarbon group is selected independently at each occurrence from the group consisting of $C_1$-$C_{12}$ alkyl.

5. The electrolyte composition according to claim 1, wherein at least one of $R^1$, $R^2$, and $R^3$ is $(CH_2)_nS(O)_2F$, wherein n is independently at each occurrence an integer from 1 to 12 and one or more hydrogen of the $(CH_2)_n$ chain may be replaced by F, CN, $OS(O)_2F$ and/or $S(O)_2F$ and wherein one or more $CH_2$ groups of the $(CH_2)_n$ chain which are not directly connected to the N-atom or the $S(O)_2F$ group may be replaced by —O—, —C(O)O—, —OC(O)—, and/or —OS(O)$_2$—.

6. The electrolyte composition according to claim 1, wherein the compound of formula (I) is a compound of formula (II)

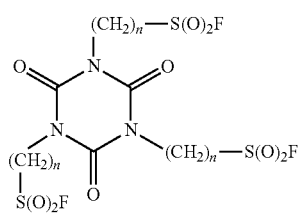

(II)

wherein n is independently at each occurrence 1, 2, 3, 4, 5 or 6.

7. The electrolyte composition according to claim 1, wherein the compound of formula (I) is

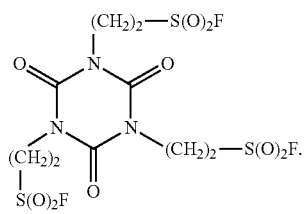

(II.1)

8. The electrolyte composition according to claim 1, wherein the electrolyte composition comprises 0.01 to 10 wt.-% of the compound of formula (I) based on the total weight of the electrolyte composition.

9. The electrolyte composition according to claim 1, wherein the electrolyte composition is non-aqueous.

10. The electrolyte composition according to claim 1, wherein the aprotic organic solvent (i) is selected from the group consisting of fluorinated and non-fluorinated cyclic and acyclic organic carbonates, fluorinated and non-fluorinated ethers and polyethers, fluorinated and non-fluorinated cyclic ethers, fluorinated and non-fluorinated cyclic and acyclic acetals and ketals, fluorinated and non-fluorinated orthocarboxylic acids esters, fluorinated and non-fluorinated cyclic and acyclic esters and diesters of carboxylic acids, fluorinated and non-fluorinated cyclic and acyclic sulfones, fluorinated and non-fluorinated cyclic and acyclic nitriles and dinitriles, fluorinated and non-fluorinated cyclic and acyclic phosphates, and mixtures thereof.

11. The electrolyte composition according to claim 1, wherein the at least one aprotic organic solvent (i) is selected from the group consisting of fluorinated and non-fluorinated ethers and polyethers, fluorinated and non-fluorinated cyclic and acyclic organic carbonates, and mixtures thereof.

12. The electrolyte composition according to claim 1, wherein the at least one conducting salt (ii) is selected from the group consisting of lithium salts.

13. An electrochemical cell comprising the electrolyte composition according to claim 1.

* * * * *